(No Model.) 3 Sheets—Sheet 2.
W. T. WOOD.
DUMPING CART.
No. 525,379. Patented Sept. 4, 1894.
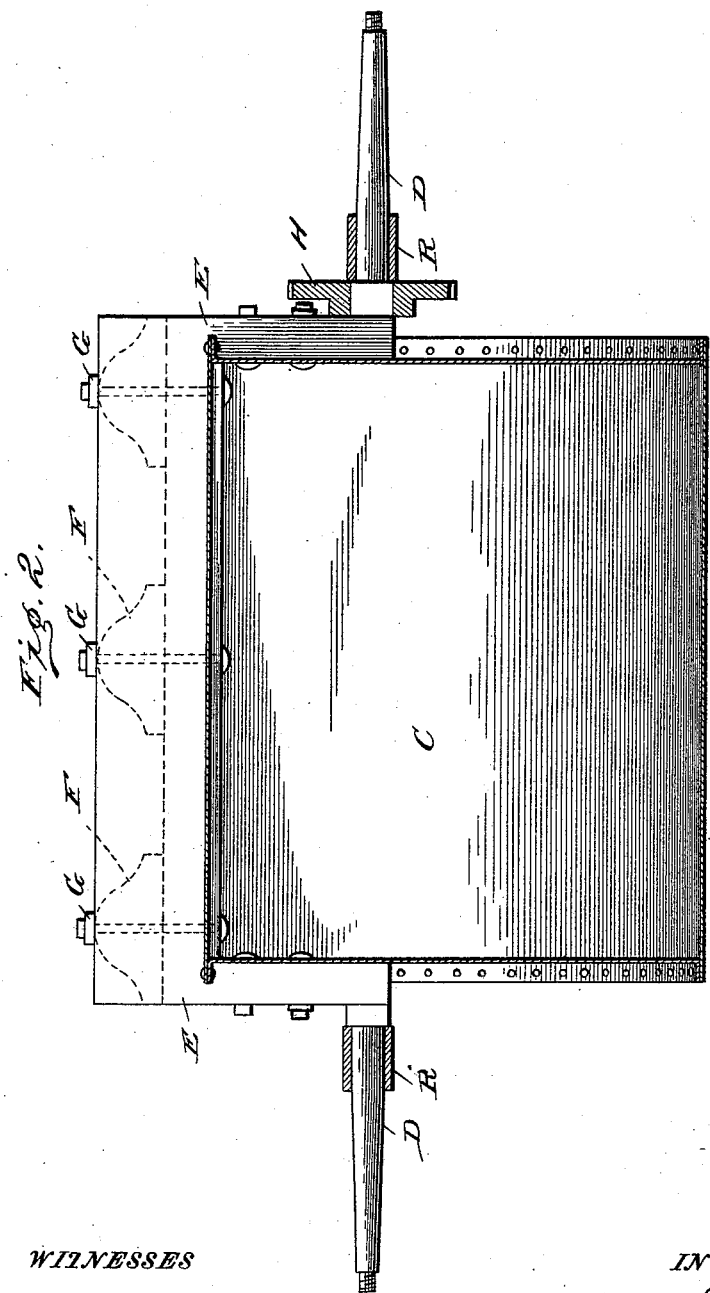
WITNESSES
Edwin L Bradford
Volney S. Wood
INVENTOR
Wm T Wood
By Attorney
William P. Wood

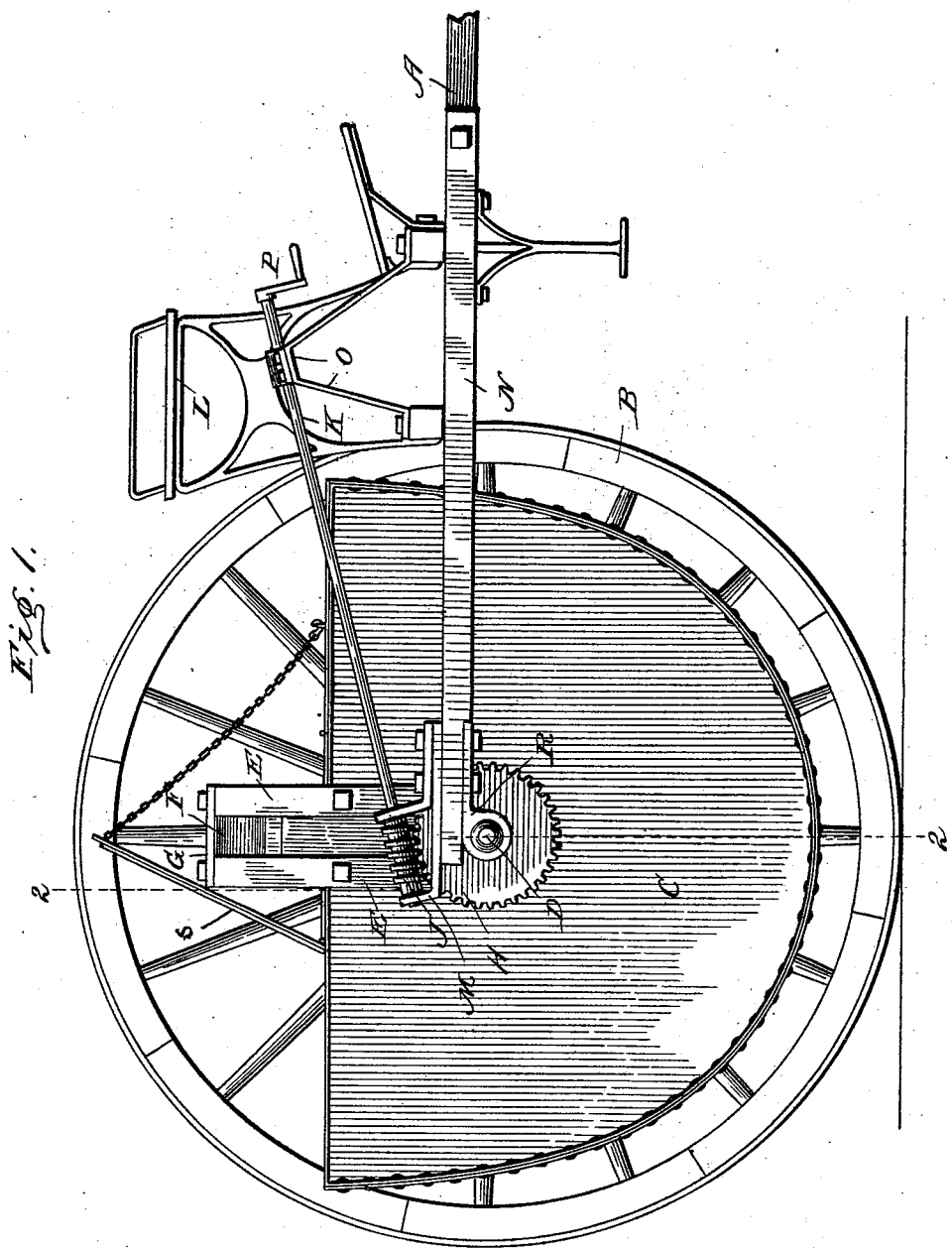

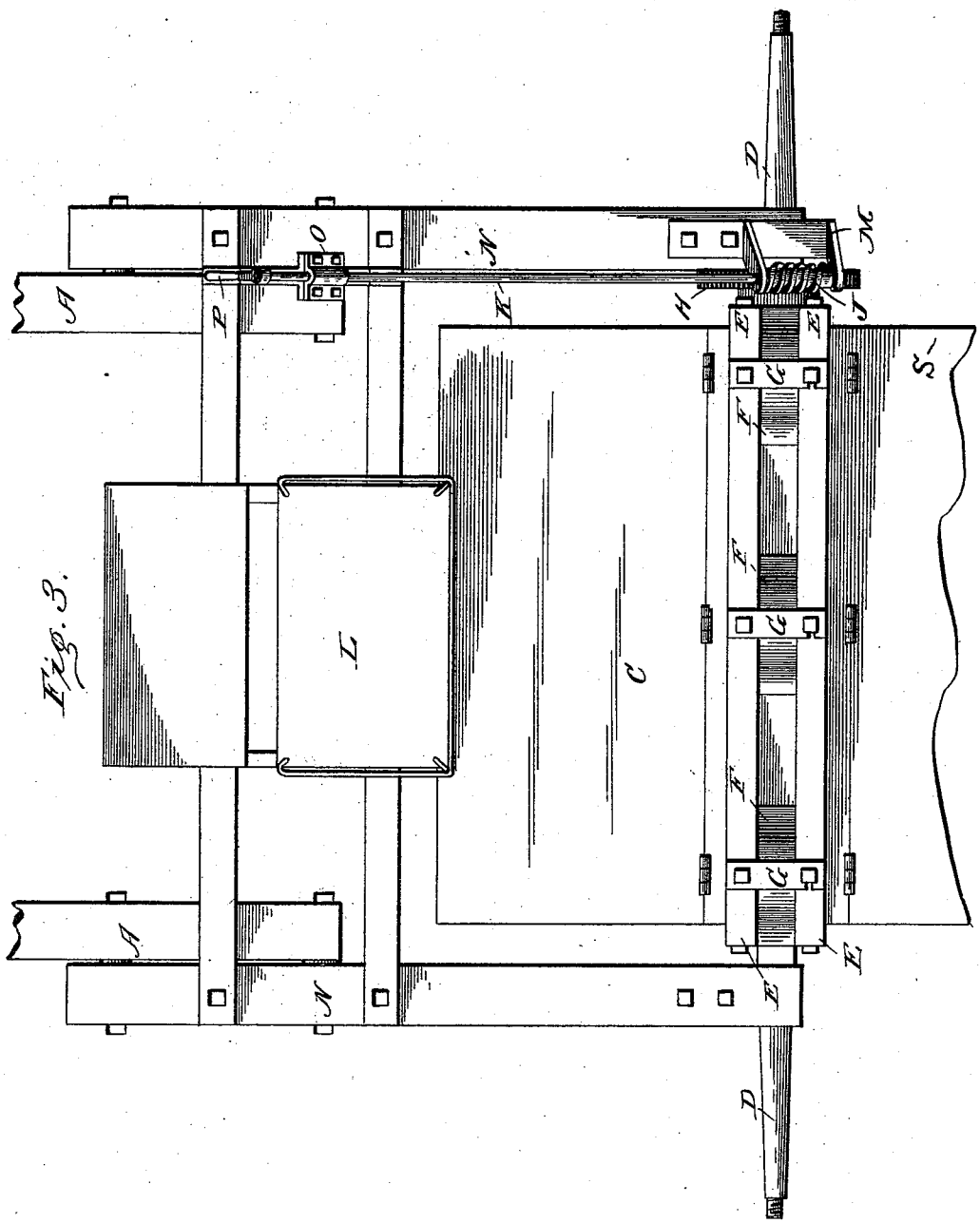

UNITED STATES PATENT OFFICE.

WILLIAM T. WOOD, OF WASHINGTON, DISTRICT OF COLUMBIA.

DUMPING-CART.

SPECIFICATION forming part of Letters Patent No. 525,379, dated September 4, 1894.

Application filed February 7, 1894. Serial No. 499,413. (No model.)

*To all whom it may concern:*

Be it known that I, WILLIAM T. WOOD, of Washington city, in the District of Columbia, have invented a new and Improved Dumping-Cart; and I hereby declare that the following is a full, clear, and exact description thereof.

The purpose of my invention is to provide a simply constructed dumping cart with a dumping tank, having a plain inner surface, free from all projections, without holes in the sides of the tank, or plates attached thereto, so as to afford no chance for leakage, and producing a dumping cart which can be readily loaded (the tank or cart body being near the ground making) a tank suitable for transporting liquids, garbage, ashes, gravel, broken stone, &c.; which can with slight effort be dumped in one place, or the load can be distributed on the ground at the will of the driver while the cart is in motion; and the dumping and distributing can be made from the driver's seat, and the tank easily returned to its carrying position, or held securely at any desired angle.

The peculiarities of the construction of my dumping cart will be hereinafter fully described, and the specific features of my invention designated; reference will be had to the accompanying drawings, wherein similar letters of reference indicate corresponding parts.

In the drawings, Figure 1, is a side elevation of a dumping cart constructed according to my invention. Fig. 2 is a sectional elevation on the line at 2, 2, (designated in Plate 1.) Fig. 3 is a top view of the forward portion of my dumping cart. Fig. 1 shows a portion of the shaft A broken away.

The cart wheel B is of sufficient diameter to allow the operation of the tank or cart-body C. The tank C, is constructed with two flat sides, which play between the wheels B, while from front to rear end it has a semi-circular form, from a point about two thirds of the depth of the tank C; the upper third of which is slightly angled to the top edge thereof, so that the lower bend of the axle center will approximate a balancing position of the tank or cart-body C, and admit of free operation for dumping its load.

The axle D is a square bar having bends the width of the tank C, and extending downward to about one third of its depth where another bend of the axle D is made, to which the hub of the wheel B is fitted. On the sides of the axle D are fitted guide bars E, which inclose the axle D on the top, and a portion of the sides of the tank C. The side guide bars E are properly fitted to the axle D to enable easy separation of the tank C, therefrom; the upper guide bars E having bolts passing through them, holding the tank C and the guide bars E together. The springs F rest on the top of the axle D having plates G with a slotted end (or ends) bolted above and on top of the springs F; there are also plates G on the lower end of the guide bars E bolted thereto to stiffen and secure together the side guide bars E to the tank C, and also aid in strengthening the axle D. The worm or gear wheel H is secured to the axle D, so that the worm screw J may be worked by a screw rod K running through it, and operated from the driver's seat L, where the tank C can be readily held in any position desired at the will of the driver, (or can be operated from the ground.) The screw rod K has its lower bearings M on the sill N, to which the screw worm J and screw rod K is secured; the upper end of said rod K has a bearing O to keep the rod K in place, the screw rod K has a crank P (or wheel attachment) on the end thereof, in convenient reach from the driver's seat L. Bearings O are secured to the upper side of the sill N to hold the worm screw in place. Other bearings R are secured to the under side of the sill N for connecting with the axle D.

It is obvious that the axle guide bars E can be made the size of the axle D, and the plates G can bear directly on the axle D without the intervention of the springs F, (if a spring cart is not desired.) The carrying capacity of the tank, or cart-body C can also be enlarged, by the use of a wheel B of suitable diameter for such purpose, and the sill N proportionately increased.

The tank or cart-body C, can be open on the front and rear ends of the top, except the requisite space for the axle D, and the guide bars E; and one or both ends of the top cover S can be hinged if so required.

A pole for two horses can be attached to the sill N in place of the shafts A (Fig. 3), where two horses will be required to draw the load.

For sanitary purposes in the collection and handling of garbage intended for cremation or for manufacturing fertilizers, my invention has advantages over other dumping carts now in use, as it can be driven on a platform so constructed, that the wheels are raised to the proper height to allow the tank or cart-body to be lowered from the axle; this is done by attaching a crane or derrick or other suitable device to the cart-body, and turning the slotted plates G, parallel with the top guide bars E, when the tank or cart-body can be lowered from the axle, and the tank can be hoisted or lowered to the furnace or boiler or other receptacle, and emptied where desired; when relieved of its contents, the tank or cart-body can be returned to the axle by the same appliance, or a clean tank or cart-body can be attached to the axle, and held securely in place by the slotted plates G.

If it is desired to transport the tank containing the garbage by rail or boat the advantage of my construction of tank or cart body is clearly apparent, as when the tank is once sealed, it need not be dumped or opened within the city limits, thus removing all traces of odor while in transit, or at the wharf or depot; for it is only necessary after detaching the loaded tank from the axle, to attach another tank thereto in place of the one detached.

Repairing (which is often necessary) of the axles of dumping carts having bent axles passing through the sides of the cart-body, are troublesome and expensive, necessitating the removal of the plates that cover the openings through which the axle was passed into the cart-body; the construction of my invention avoids this objection, as the bent axle in my dumping cart passes over the top of the tank or cart-body C which is held in place on the sides of the axle D by guide bars E which are bolted to the cart-body C, which is held in place on the sides of the axle D, by guide bars E, which are bolted to the cart-body, and the tank or cart-body is held securely to the axle by the slotted plates G, while the tank is readily separated from the axle D, by turning the slotted plates parallel with the guide bars E.

Having now fully described my invention, what I claim as new, and desire to secure by Letters Patent, is—

1. The combination of a bent axle extending over the top of a tank or cart-body, and rigidly attached thereto, whereby the axle and cart-body are together revoluble within the hubs of the wheels, substantially as described.

2. A tank or cart-body having guides embracing the axle across the top to sustain the load and relieve the tank or cart-body sides from jar or strain.

3. A tank or cart-body having guides embracing the axle across the top, and extending down its sides; the side guides to be secured so as to admit the tank or cart-body to slide freely from the axle.

4. The plates extending across the guide bars on the top of the tank or cart-body, and the springs placed between the plates and the top of the axle, to support the tank or cart-body substantially as described.

5. The guide bars to stiffen the sides of the tank or cart-body, in combination with the plates to support and strengthen the axle, substantially as described.

6. The guide bars attached to the cart body, in combination with the bent axle and dumping mechanism, whereby the cart body is tilted or held securely in any position, or removed from the axle, substantially as described.

7. The combination of a bent axle extending over the tank or cart-body, a worm gear attached to the lower part of the axle, and a worm screw attached to the sill or shaft of the cart, whereby the cart-body is tilted or dumped, substantially as described.

8. The combination of the guide bars attached to the tank or cart body with a bent axle, extending across the top of the cart, whereby the cart-body is held on the axle in dumping the same, and capable of movement on, and removal therefrom, substantially as described.

9. In a cart having a bent axle, extending over its body, and said body rigidly secured thereto, but also detachable therefrom, substantially as described.

10. The plates extending across the guides or supporting bars, on the top of the tank or cart-body to support the same, substantially as described.

11. In a cart having a bent axle extending over its body, a tank or cart-body rigidly secured to the axle for dumping or tilting, but having a free sliding motion for spring movement, and downward removal, substantially as described.

WILLIAM T. WOOD.

Witnesses:
ALBERT H. SHILLINGTON,
VOLNEY S. WOOD.